(12) United States Patent
Bendiganavale et al.

(10) Patent No.: US 10,831,587 B2
(45) Date of Patent: Nov. 10, 2020

(54) DETERMINATION OF CAUSE OF ERROR STATE OF ELEMENTS IN A COMPUTING ENVIRONMENT BASED ON AN ELEMENT'S NUMBER OF IMPACTED ELEMENTS AND THE NUMBER IN AN ERROR STATE

(71) Applicant: Hewlett Packard Enterprise Development LP, Houston, TX (US)

(72) Inventors: Maneesh Keshavan Bendiganavale, Karnataka (IN); Pavan Belur Gopalakrishna Upadhya, Karnataka (IN); Naveena Kedlaya, Karnataka (IN); Vinay Sahadevappa Banakar, Karnataka (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 179 days.

(21) Appl. No.: 16/048,291

(22) Filed: Jul. 29, 2018

(65) Prior Publication Data
US 2020/0034222 A1 Jan. 30, 2020

(51) Int. Cl.
*G06F 11/07* (2006.01)
*G06F 16/901* (2019.01)
*G06F 11/34* (2006.01)

(52) U.S. Cl.
CPC ........ *G06F 11/079* (2013.01); *G06F 11/0751* (2013.01); *G06F 16/9024* (2019.01); *G06F 11/0793* (2013.01); *G06F 11/3447* (2013.01)

(58) Field of Classification Search
CPC .............. G06F 11/079; G06F 11/0751; G06F 11/0793; G06F 11/3409; G06F 11/3447; G06F 11/3452; G06F 11/2257; G06F 11/2263; G06N 5/04; G06N 5/042
See application file for complete search history.

(56) References Cited

U.S. PATENT DOCUMENTS

| 7,096,459 | B2* | 8/2006 | Keller | G06F 11/0709 |
| | | | | 714/E11.027 |
| 2005/0172306 | A1* | 8/2005 | Agarwal | G06F 11/008 |
| | | | | 719/328 |
| 2013/0097183 | A1* | 4/2013 | McCracken | G06F 11/0709 |
| | | | | 707/748 |
| 2017/0068581 | A1 | 3/2017 | Qi et al. | |
| 2017/0075744 | A1* | 3/2017 | Deshpande | H04L 41/0631 |

FOREIGN PATENT DOCUMENTS

WO 2014/088559 A1 6/2014

OTHER PUBLICATIONS

Zhai et al., "Auditing the Structural Reliability of the Clouds", Yale University Department of Computer Science, Jul. 2013, 28 pages.

* cited by examiner

*Primary Examiner* — Joseph O Schell
(74) *Attorney, Agent, or Firm* — Hewlett Packard Enterprise Patent Department

(57) ABSTRACT

In an example, suspect scores for impacting elements that can cause an error state of a first element are computed. The computation is performed based on states of each element for which the impacting element can cause the error state.

20 Claims, 6 Drawing Sheets

DETERMINATION OF CAUSE OF ERROR STATE OF ELEMENTS IN A COMPUTING ENVIRONMENT BASED ON AN ELEMENT'S NUMBER OF IMPACTED ELEMENTS AND THE NUMBER IN AN ERROR STATE

BACKGROUND

An element that is part of a computing environment may be impacted by several other elements of the computing environment. Such an impact may cause the element to change from a normal state to an error state. For example, a data center may include a server and a power supply supplying power to the server. The server may change to an error state due to a failure of the power supply.

BRIEF DESCRIPTION OF DRAWINGS

The following detailed description references the figures, wherein.

DETAILED DESCRIPTION

Figure 1:
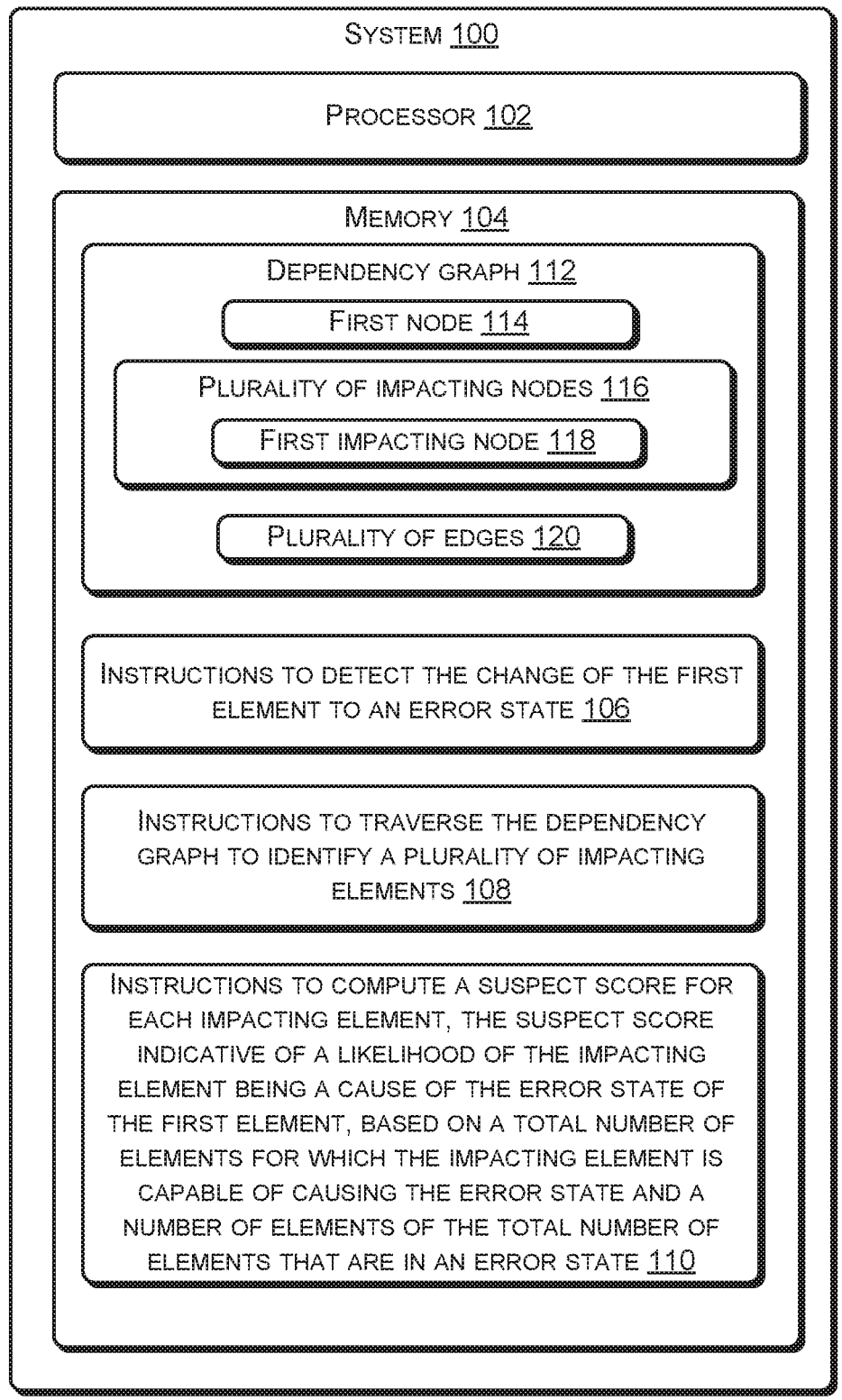
FIG. 1 illustrates a system to determine a cause of an error state of an element, according to an example implementation of the present subject matter.

A computing environment, such as a data center, may include several elements. A state of a first element may be impacted by several impacting elements in the computing environment. In such a case, when the first element changes state, such as from a normal state to an error state, the cause of the state change may not be the first element itself, but one of the impacting nodes. As will be understood, an actual cause of the state change is to be determined if the first element is to be restored to its normal state.

Generally, to determine the cause of the state change, analysis of several log files and manual correlation of past events is to be performed. In such a case, the determination of the cause may be laborious, time-consuming, and error-prone.

The present subject matter relates to determination of cause of error state of elements, such as elements in a computing environment. With the implementations of the present subject matter, an element that caused an error state of another element may be determined in a fast, simple, accurate, and efficient manner.

In accordance with an example implementation, a dependency graph indicative of a computing environment may be created. The dependency graph may include a first node and a plurality of impacting nodes. The first node represents a first element in the computing environment and each impacting node of the plurality of impacting nodes represents an impacting element that can cause an error state of the first element. For example, each impacting element can cause the first element to change from a normal state to the error state. Of the plurality of impacting elements, a first impacting element can cause the error state of the first element without a change in its own state. For example, the first element may be a computing device and the first impacting element may be software or firmware interacting with the computing device.

When the first element changes its state to the error state, a suspect score is computed for each impacting element. The suspect score for an impacting element indicates a likelihood of the impacting element being a cause of the error state of the first element. The suspect score for an impacting element may be computed based on state of each element for which the impacting element can cause the error state. In an example, the suspect score is computed based on a total number of elements for which the impacting element can cause the error state and a number of those total number of elements that are in the error state.

The present subject matter enables determination of the cause of error state of elements of a computing environment. The computation of suspect score for an impacting element based on the states of each element for which the impacting element can cause an error state provides an accurate measure of the likelihood of the impacting element being the cause of the error state. For example, if several elements impacted by an impacting element are in the error state, it can be concluded that the likelihood of that impacting element being the cause of the error state is high. Further, the present subject matter ensures that the suspect score is computed even for impacting elements that cause the error state of other elements without undergoing a state change themselves. Therefore, the present subject matter can be used to identify elements that cause the error state of other elements without changing to an error state themselves or without reporting an event themselves.

The following description refers to the accompanying drawings. Wherever possible, the same reference numbers are used in the drawings and the following description to refer to the same or similar parts. While several examples are described in the description, modifications, adaptations, and other implementations are possible and are intended to be covered herein.

Example implementations of the present subject matter are described with regard to elements of a data center. Although not described, it will be understood that the implementations of the present subject matter can be used for any computing environment in which the state of an element is impacted by other elements.

FIG. 1 illustrates a system 100 to determine a cause of an error state of an element, according to an example implementation of the present subject matter. The system 100 may be implemented as any of a variety of computing systems, such as a desktop computer, a laptop computer, and a server. The system 100 includes a processor 102 and a memory 104 coupled to the processor 102.

The processor 102 may be implemented as microprocessors, microcomputers, microcontrollers, digital signal processors, central processing units, state machines, logic circuitries, and/or any devices that manipulate signals based on operational instructions. Among other capabilities, the processor 102 may fetch and execute computer-readable instructions stored in the memory 104. The computer-readable instructions, hereinafter referred to as instructions, includes instructions 106, instructions 108, and instructions 110. The functions of the processor 102 may be provided through the use of dedicated hardware as well as hardware capable of executing machine readable instructions.

The memory 104 may include any non-transitory computer-readable medium including volatile memory (e.g., RAM), and/or non-volatile memory (e.g., EPROM, flash memory, Memristor, etc.). The memory 104 may also be an external memory unit, such as a flash drive, a compact disk drive, an external hard disk drive, or the like.

In addition to the processor 102 and the memory 104, the system 100 may also include interface(s) and system data (not shown in FIG. 1). The interface(s) may include a variety of machine readable instructions-based interfaces and hardware interfaces that allow interaction with a user and with other communication and computing devices, such as network entities, web servers, and external repositories, and peripheral devices. The system data may serve as a repository for storing data that may be fetched, processed, received, or created by the instructions.

The memory 104 stores a dependency graph 112 that corresponds to a computing environment (not shown in FIG. 1). The computing environment may be, for example, a data center, which is a facility including several computing devices, such as servers, and their associated components, such as telecommunication systems, storage systems, and power supplies. The dependency graph 112 may be defined as a logical representation of its corresponding computing environment. Such a logical representation may indicate the elements of the computing environment and dependence of each element of the computing environment on other elements of the computing environment. Accordingly, the dependency graph 112 may include a first node 114 representing a first element (not shown in FIG. 1) of the computing environment. The first element may be any element of the computing environment that is impacted by other elements of the computing environment.

The dependency graph 112 may also include a plurality of impacting nodes 116, collectively referred to as impacting nodes 116 and individually referred to as impacting node 116. Each impacting node 116 represents an impacting element of a plurality of impacting elements, hereinafter referred to as impacting elements (not shown in FIG. 1) in the computing environment. Each impacting element is capable of causing an error state of the first element. An impacting element being capable of causing the error state of the first element may be interchangeably referred to as the impacting element impacting a state of the first element or the impacting element impacting the first element. Further, an impacting element capable of causing the error state of the first element may be also referred to as to causing the first element to change from a normal state to the error state.

The impacting nodes 116 include a first impacting node 118 corresponding to a first impacting element (not shown in FIG. 1) of the impacting elements. The first impacting element can cause the error state of the first element without changing its own state. For example, the first impacting element can cause the first element to change to the error state without itself changing to an error state.

The dependency graph 112 further includes a plurality of edges 120, collectively referred to as edges 120 and individually referred to as edge 120. Each edge 120 connects an impacting node 116 to the first node 114 to indicate a direction of impact of an impacting element on the state of the first element. For example, an edge 120 may indicate an arrow moving from an impacting node 116 to the first node 114, to indicate that the corresponding impacting element impacts the state of the first element.

In operation, when executed by the processor 102, the instructions 106 enable detecting a change of state of the first element to the error state. Further, the instructions 108 cause traversal of the dependency graph 112 to identify the impacting elements, which impact the first element.

For each impacting element, instructions 110 cause computation of a suspect score. The suspect score for an impacting element indicates a likelihood of the impacting element being a cause of the error state of the first element. The computation of the suspect score may be performed based on a total number of elements that are impacted by the impacting element and a number of elements of the total number of elements that are in the error state. For example, an impacting element may impact the state of 'T' elements, i.e., can cause the error state for 'T' elements. Of the 'T' elements, 'P' (P≤T) elements may be in the error state. Accordingly, the suspect score for the impacting element may be computed based on 'T' and 'P'.

The computation of the suspect score and other aspects of the present subject matter will be explained in greater detail with reference to the subsequent figures.

Figure 2:
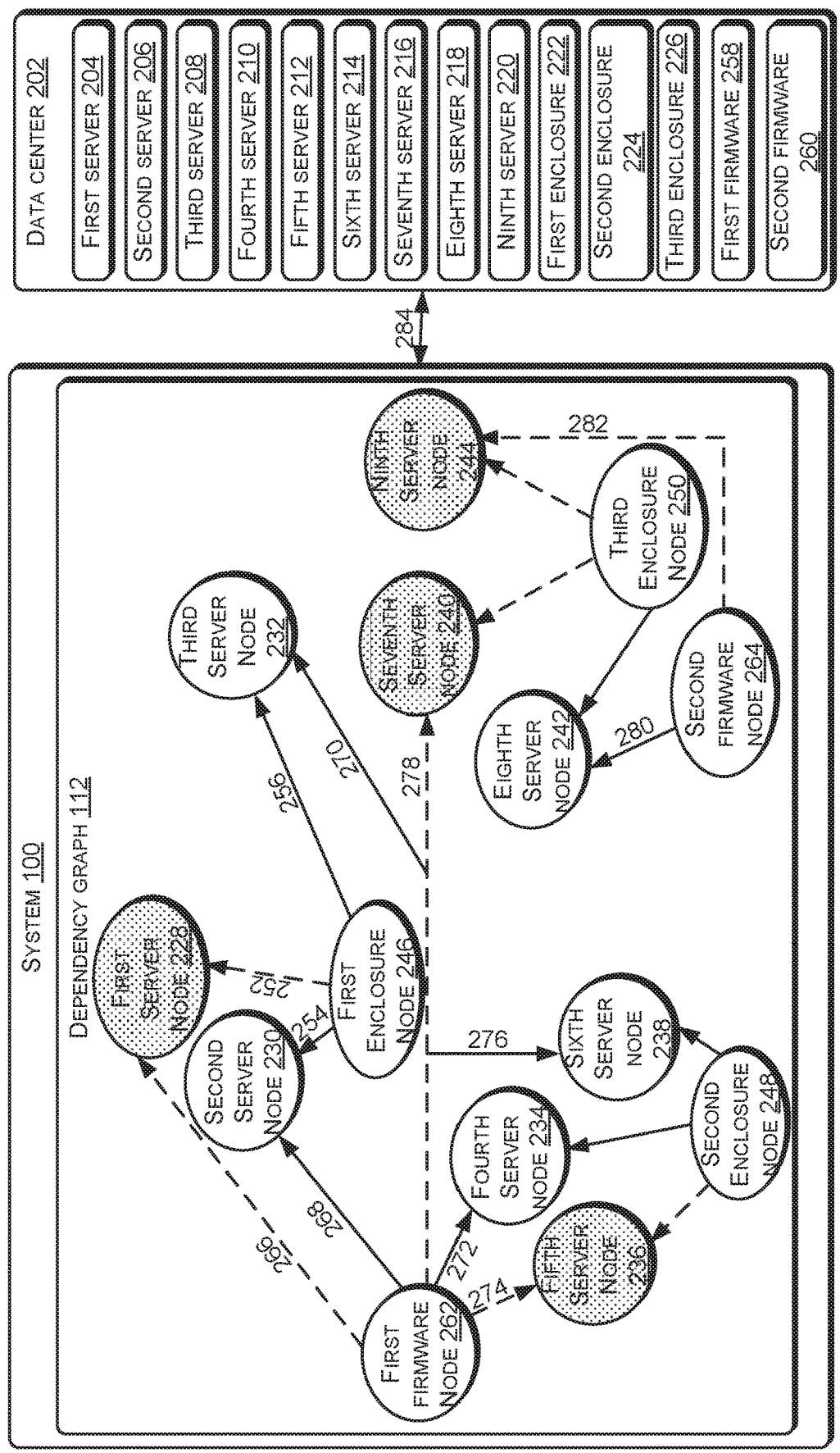
FIG. 2 illustrates a system having a dependency graph, according to an example implementation of the present subject matter.

FIG. 2 illustrates the system 100 having the dependency graph 112, according to an example implementation of the present subject matter. As mentioned earlier, the dependency graph 112 corresponds to a computing environment. The dependency graph 112 corresponding to the computing environment means that the dependency graph 112 depicts the elements in the computing environment and the relationships between the elements. The elements of the computing environment may be represented in the form of nodes in the dependency graph 112 and the relationships may be represented in the form of edges in the dependency graph 112. As mentioned earlier, the computing environment may be, for example, a data center 202. Hereinafter, the computing environment will be explained with reference to the data center 202. However, it is to be understood that the computing environment may be any other type of computing environment as well.

The data center 202 includes a plurality of elements. For example, the data center 202 may include a first server 204, second server 206, third server 208, fourth server 210, fifth server 212, sixth server 214, seventh server 216, eighth server 218, and ninth server 220, collectively referred to as servers 204-220. In addition to the servers 204-220, the data center 202 may include several additional components as well. The additional components may include, for example, a first enclosure 222, second enclosure 224, and third enclosure 226, collectively referred to as enclosures 222-226, each of which can house servers. In an example, the first enclosure 222 may house the first server 204, second server 206, and third server 208, the second enclosure 224 may house the fourth server 210, fifth server 212, and sixth server 214, and the third enclosure 226 may house the seventh server 216, eighth server 218, and ninth server 220.

Since the servers 204-220 are housed in enclosures 222-226, the enclosures 222-226 can impact the states of the servers 204-220 that are housed in them. For example, a fault in a midplane of the first enclosure 222 may impact connectivity of the first server 204.

Accordingly, the enclosures 222-226 may be referred to as impacting elements. As mentioned earlier, an impacting element impacting the state of an element means that the impacting element can cause the element to change from a normal state to an error state. A normal state of an element refers to a state in which the element is functioning, it is operating at an optimal level, various operating parameters of the element are in a normal operating range, various components of the element are in a functional state, the various components are operating at an optimal level, and operating parameters of the various components are in the normal operating range. For example, a server may be said to be at its normal state when the server is functional, when it is receiving input voltage in a normal operating range, all its power supplies are receiving input power (in case the server has redundant power supplies), its components, such as disk, are functional, its components are having a temperature in their normal operating range, and the like. An element may be said to operate at an optimal level if various parameters indicative of the performance of the element are at their respective rated levels or ranges. For example, a switch may be said to operate at an optimal level if a count of packets dropped by the switch is lesser than a predetermined threshold. The operating parameters of the element may include operating parameters of services running on the element as well. For example, a normal state of a server may depend on whether the services running on the server are complying with their respective service level agreement (SLA) parameters.

An error state of the element refers to a deviation from its normal state. For example, when the element is not functioning, when it is operating at a sub-optimal level, when any operating parameter of the element is outside its normal operating range, when any component of the element is in a non-functional state, when any component of the element is operating at a sub-optimal level, or when any operating parameter of any component is outside its normal operating range, the element may be said to be in the error state.

As mentioned earlier, the dependency graph 112 corresponds to the data center 202. Accordingly, the dependency graph 112 includes nodes corresponding to elements in the data center 202. For example, the dependency graph 112 includes a first server node 228 corresponding to the first server 204, a second server node 230 corresponding to the second server 206, . . . , a ninth server node 244 corresponding to the ninth server 220. Similarly, the dependency graph 112 also includes a first enclosure node 246 corresponding to the first enclosure 222, a second enclosure node 248 corresponding to the second enclosure 224, and a third enclosure node 250 corresponding to the third enclosure 226. In addition to the nodes, the dependency graph 112 also includes the edges 120. The edges 120 indicate the impact of an impacting element on another element. For example, the edges 120 include edges 252, 254, and 256, which indicate impact of the first enclosure 222 on the first server 204, second server 206, and third server 208, respectively.

In addition to physical elements, such as enclosures 222-226, logical elements may also impact an element of the data center 202. The logical elements may be, for example, firmware or software that interact with the element. For instance, the element may be a server of the data center 202, such as the first server 204, and the logical element may be firmware interacting with the first server 204. In an example, the firmware interacting with the server may be a firmware of a remote management processor embedded in the server. Such a remote management processor may facilitate management of the server from a remote location, such as from outside the data center 202. The management of the server facilitated by the remote management processor may include monitoring, updating, configuring, and repairing of the server. In some examples, the remote management processor enables monitoring health of components of the server, such as fans, network, processors, power supplies, and storage, viewing logs and events of the server, managing power consumption of the server, and the like. The remote management processor is also referred to as baseboard management controller (BMC).

In an example, a first firmware 258 may be interacting with the first server 204, second server 206, . . . , and seventh server 216. Further, a second firmware 260 may be interacting with the eighth server 218 and ninth server 220. Here, a firmware interacting with multiple servers refers to different instances of the firmware interacting with the different servers. For example, a first instance of the firmware may be the firmware of the remote management processor embedded in the first server 204, while a second instance of the firmware may be the firmware of the remote management processor embedded in the eighth server 218. Further, in some cases, two firmware may be referred to as being different if they are different versions of the same type of firmware. For example, the first firmware 258 may be a version of number 2.30 of a particular firmware, while the second firmware 260 may be a version of number 2.51 of that particular firmware. In a further example, the first firmware 258 and the second firmware 260 may be correspond to different physical elements, and may be of different types altogether. For example, while the first firmware 258 may correspond to the remote management processor, the second firmware 260 may correspond to a storage controller (not shown in FIG. 2).

Similar to the physical elements, the logical elements may also be captured in the dependency graph 112. For example, the dependency graph 112 may include a first firmware node 262 corresponding to the first firmware 258 and a second firmware node 264 corresponding to the second firmware 260. Further, edges 266, 268, . . . , and 278 indicate the impact of the first firmware 258 on the state of the first server 204, second server 206, . . . , and seventh server 216, respectively. Similarly, the impact of the second firmware 260 on the state of the eighth server 218 and ninth server 220 are represented by edges 280 and 282, respectively. The inclusion of the nodes corresponding to the logical elements of the data center 202, in addition to the nodes corresponding to the physical elements, in the dependency graph 212 enables capturing the impact of the logical elements on a given element of the data center 202. For example, the impact on the state of a server by a firmware interacting with the server can be determined using the present subject matter. This makes the determination using the present subject matter a more comprehensive and a more accurate one.

Although not illustrated, the data center 202 may include several other elements, such as an interconnect, a power supply, a network switch, and a service running on a server of the data center 202. Corresponding to each such element, the dependency graph 112 may include a node. Further, such elements may be impacted by other elements or may impact other elements. Therefore, based on the direction of the impact, edges connecting the node to another node of the dependency graph 112 may be provided.

As explained above, an element of the data center 202 may be impacted by several other impacting elements of the data center 202. Accordingly, when an element of the data center 202 changes to the error state, suspect score may be computed for each impacting element that impacts the element.

To enable detection of the change of state of the elements of the data center 202, the system 100 may be connected to the data center 202 through a connection 284. In an example, the connection 284 may be a communication network, and may be interchangeably referred to as the communication network 284. The communication network 284 may be a wireless network or a wired network, or a combination thereof. The communication network 284 may be a collection of individual networks, interconnected with each other and functioning as a single large network (e.g., the internet or an intranet). Examples of such individual networks include Global System for Mobile Communication (GSM) network, Universal Mobile Telecommunications System (UMTS) network, Personal Communications Service (PCS) network, Time Division Multiple Access (TDMA) network, Code Division Multiple Access (CDMA) network, Next Generation Network (NGN), Public Switched Telephone Network (PSTN), and Integrated Services Digital Network (ISDN). Depending on the technology, the communication network 284 includes various network entities, such as transceivers, gateways, and routers.

Although the system 100 is shown external to the data center 202, in an example, the system 100 may be part of the data center 202. Even in such a case, the connection 284 may facilitate a connection of the system 100 to each element of the data center 202 to monitor the state of each element.

As mentioned earlier, the first element may be any element in the data center 202 that is impacted by other elements of the data center, and the first node 114 may be the node in the dependency graph 112 that corresponds to the first element. Accordingly, in an example, the first element may be the first server 204 and the first node 114 may be the first server node 228. In other examples, the first element may be an interconnect or a switch (not shown in FIG. 2) and the first node 114 may be an interconnect node or a switch node (not shown in FIG. 2), respectively.

In an example, upon change of the state of an element, the node corresponding to the element may be represented differently in the dependency graph 112 compared to the nodes corresponding to the elements in the normal state. For example, when the element changes to the error state, the node corresponding to the element may be hatched. Further, the node may remain hatched until the element corresponding to the node changes to the normal state. Therefore, when the dependency graph 112 is displayed on a display (not shown in FIG. 2) of the system 100, a viewer can easily discern the states of the various elements of the data center 202. In addition to altering the representation of a node corresponding to the element in the error state, the incoming edges to the node may also be represented differently. For example, the incoming edges to the node may be dashed. For example, when the first server 204 is in the error state, all incoming edges to the first server node 228, i.e., the edge 252 and edge 266 may be dashed.

Upon detection of the change of state of the first element to the error state, the instructions 108 enable traversal of the dependency graph 112 to identify the impacting elements of the first element. For example, when the first element is the first server 204, the instructions 108 may cause analysis of the dependency graph 112 to identify all nodes that have an edge directed towards the first server node 228, which is the node corresponding to the first server 204. Consequently, the impacting elements may be identified as the first enclosure 222 and the first firmware 258.

For each identified impacting element, the instructions 110 enable computation of a suspect score. As mentioned earlier, the suspect score for an impacting element indicates a likelihood of the impacting element being a cause of the error state of the first element 114. The suspect score for an impacting element may be computed based on a total number of elements that are impacted by the impacting element and a number of the total number of elements that are in the error state. An element impacted by an impacting element may be referred to as an impacted element for the impacting element. Also, the total number of elements that are impacted by the impacting element may be referred to as the total number of impacted elements for the impacting element, and may be represented by 'T'. Further, a number of the total number of elements that are in the error state may be referred to as the number of impacted elements in the error state for the impacting element, and may be represented by 'P'.

Continuing with the previous example of the first server 204 being the first element, suspect scores may be computed for the first enclosure 222 and the first firmware 258. The impacted elements for the first enclosure 222 are the first server 204, second server 206, and third server 208, as indicated by the edges 252, 254, and 256 of the dependency graph 112. Accordingly, the total number of impacted elements for the first enclosure 222 (T) is three. Of the three impacted elements, the first server 204 may alone be in the error state, as indicated by the hatching of the first server node 228. Accordingly, the number of the impacted elements in the error state for the first enclosure 222 (P) is one.

Similarly, the impacted elements for the first firmware 258 are the first server 204, second server 206, . . . , and seventh server 216. Accordingly, the total number of impacted elements for the first firmware 258 (T) is seven. Of the seven impacted elements, the first server 204, fifth server 212, and seventh server 216 may be in the error state, as illustrated in FIG. 2. Accordingly, the number of the impacted elements in the error state (P) is three.

In an example, the suspect score may be computed as a ratio of the number of the impacted elements in the error state for the impacting element to the total number of impacted elements for the impacting element. This may be represented as below:

$$S=P/T \qquad (1)$$

where S is the suspect score.

Accordingly, in the above example of the first server 204 being in the error state, the suspect score for the first enclosure 222 is 1/3 and the suspect score for the first firmware 258 is 3/7. Since the suspect score for the first firmware 258 is higher than that of the first enclosure 222, it may be concluded that the error state of the first server 204 is more likely due to the first firmware 258 than due to the first enclosure 222. Subsequently, based on their respective suspect scores, the impacting elements may be ranked.

In an example, the ranking may be displayed on the display of the system 100 when a user selects a node corresponding to an element in the error state on the dependency graph 112. Using the ranking, the user may be informed of the mostly likely cause of the error state of the element corresponding to that node. In an example, if the suspect score for an impacting element exceeds a threshold, the impacting element may be automatically determined as the cause of the error state of its impacted element. Further, the determined impacting element may be automatically repaired. For instance, if the first firmware 258 represents a particular version of the firmware, and if the first firmware 258 has a suspect score exceeding a threshold, a rollback to a previous version of the firmware may be performed.

Although, in the above examples, the suspect score is explained as the ratio of the number of impacted elements in the error state for the impacting element (P) to the total number of impacted elements for the impacting element (T), in some other examples, the suspect score may be computed in any other manner using the number of impacted elements in the error state and the total number of impacted elements.

The computation of the suspect score based on the number of impacted elements in the error state and the total number of impacted elements provides an intuitive manner of determining the impacting element that caused the error state of an impacted element. For instance, if a second impacting element totally impacts 100 elements, and of the 100 elements, if 90 are in the error state, it is highly likely that the second impacting element is the cause of the error state of the 90 elements. Contrarily, if, of the 100 elements, one element is in the error state, the second impacting element may not be the cause of the error state of that element. This is because, if the second impacting element was the cause of the error state of that element, the second impacting element may have caused at least some of the other 99 elements impacted by it to be in the error state.

As will be understood from the above explanation, upon the change of the first element to the error state, the suspect score is computed for all impacting elements of the first element in the dependency graph 112, regardless of whether the impacting element is in the error state or not. Therefore, the present subject matter enables computation of suspect scores even for an impacting element that can cause the first element to change to the error state without changing its own state. Such an impacting element, which can cause the first element to change to the error state without changing its state, is referred to as the first impacting element. In some examples, the first impacting element may be the first firmware 258 or the second firmware 260. For instance, the first firmware 258 may cause the error state of the first server 204 due to an incompatibility of the first firmware 258 with the first server 204 or a bug in the first firmware 258. Further, a third firmware (not shown in FIG. 2) may be a firmware of a network adapter (not shown in FIG. 2) that may cause the network adapter to drop packets. In such cases, while the first server 204 or the network adapter may change to the error state, the first firmware 258 or the third firmware, which caused the error state may not change its state, such as to the error state.

The computation of suspect scores for all impacting nodes 116 in the dependency graph 112, regardless of their states, ensures that impacting elements that cause a state change of an impacted element without generating any event, such as an event indicating a change of its state, or changing its state can be identified. For instance, by virtue of such a computation, even if the first firmware 258 can cause the first server 204 to change to the error state without changing its own state, the first firmware 258 can be identified as the cause of the error state of the first server 204. Further, such a computation of the suspect scores for the impacting elements ensures that the states of the impacting elements or any events generated by the impacting elements are not to be monitored. Therefore, the present subject matter provides a simpler, more comprehensive, and more accurate determination of the likely cause of state change of an element.

As mentioned earlier, an element may be said to be in the error state when the element deviates from its normal state. Also, as mentioned earlier, the element may be said to deviate from its normal state due to a variety of reasons, such as due to non-functioning of the element, the element operating at a sub-optimal level, any operating parameter of the element being outside its respective normal operating range, any component of the element being in a non-functional state, any component operating at a sub-optimal level, or an operating parameter of an component being outside its normal operating range. In an example, the error state may be categorized into one of a plurality of categories of error states for more accurate determination of the likely cause of the state change of an element. This will be explained with reference to FIG. 3.

It is to be understood that the representation of the dependency graph 112 illustrated in FIG. 2 is merely an example, and the dependency graph 112 may be in any other form which indicates the elements of the data center 202 and the dependencies among them.

Figure 3:
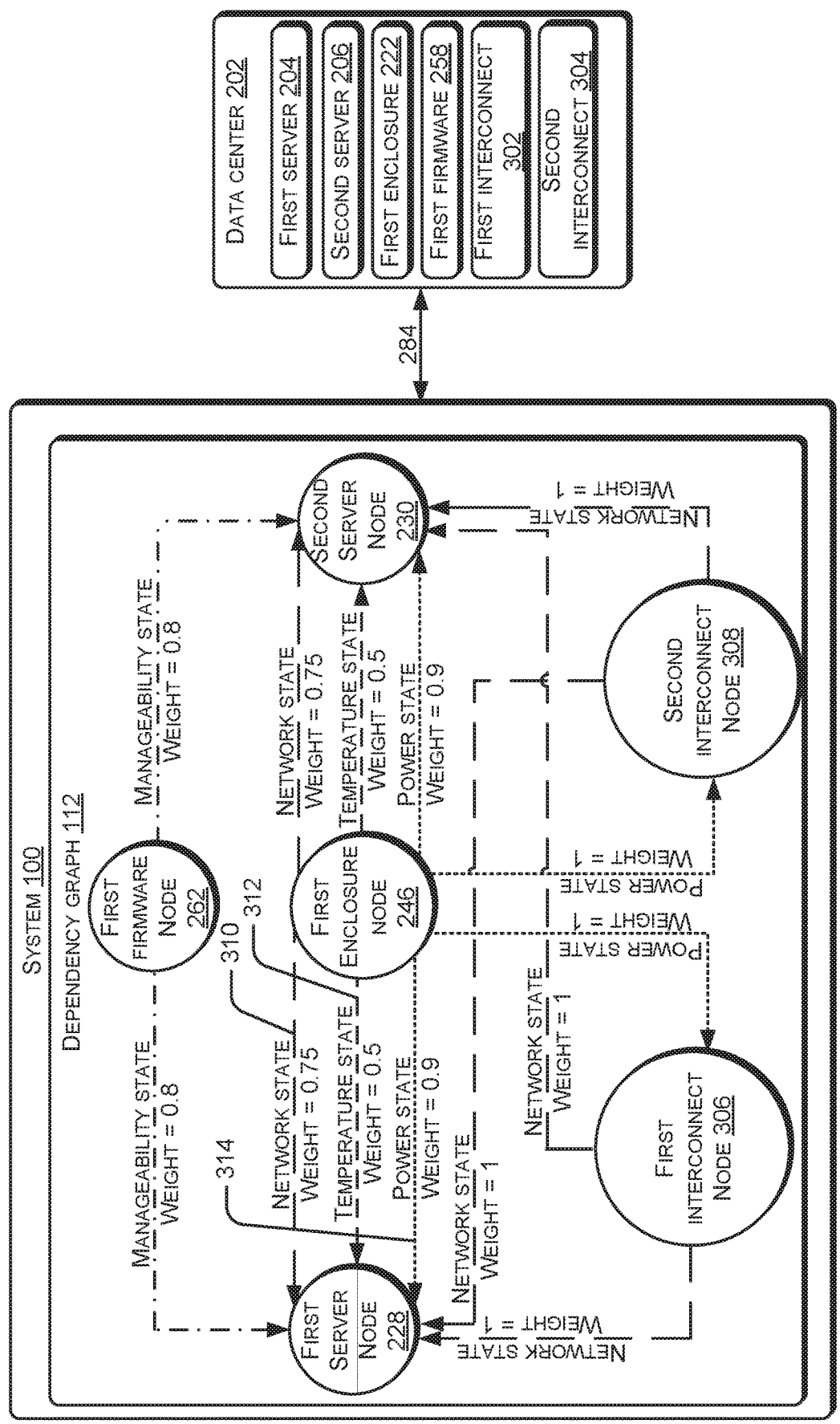
FIG. 3 illustrates a system having a dependency graph corresponding to a data center, according to an example implementation of the present subject matter.

FIG. 3 illustrates the system 100 having the dependency graph 112 corresponding to the data center 202, according to an example implementation of the present subject matter. As illustrated, the data center 202 may include the first server 204 and the second server 206, each housed in the first enclosure 222. Further, the first firmware 258 may be interacting with the first server 204 and the second server 206. The data center 202 may also include a first interconnect 302 and a second interconnect 304. The first interconnect 302 may provide connectivity between servers in the first enclosure 222, such as the first server 204 and the second server 206, while the second interconnect 304 may provide connectivity between the first server 204 and a top of rack (ToR) switch (not shown in FIG. 3) in the first enclosure 222. Each element in the data center 202 may be represented as a node in the dependency graph 112, as illustrated in FIG. 3. For example, the first interconnect 302 may be represented by a first interconnect node 306 and the second interconnect 304 may be represented by a second interconnect node 308.

As explained above, several impacting elements can impact the state of the first element. In an example, the state of the first element may be a first category of a plurality of categories of state of the first element. A category of state of the first element may be defined as an aspect of the first element that is likely to get impacted by an impacting element. For example, the first firmware 258 may impact a manageability of the first server 204, i.e., the ability to manage the first server 204 from a remote location may be impaired. Therefore, a manageability state category of the first server 204 may be said to be impacted by the first firmware 258. Similarly, the first enclosure 222 may impact the temperature of the first server 204. For instance, the first enclosure 222 may cause the temperature of the first server 204 to exceed a permissible value. Therefore, a temperature state category of the first server 204 may be said to be impacted by the first enclosure 222. Some other examples of different impacting elements impacting different aspects of an impacted element are as follows:

1. The first enclosure 222 impacts power supply to the first server 204. For instance, the first server 204 may stop receiving electric power due to the first enclosure 222. Accordingly, a power state category of the first server 204 may be said to be impacted by the first enclosure 222.

2. The first interconnect 302 impacts network of the first server 204. For instance, the first interconnect 302 may cause disruption of connectivity between the first server 204 and the second server 206. Accordingly, the network state category of the first server 204 may be said to be impacted by the first interconnect 302.

3. A switch (not shown in FIG. 3) impacts network of the first interconnect 302. Accordingly, the network state category of the first interconnect 302 may be said to be impacted by the switch.

4. A power supply (not shown in FIG. 3) impacts power supplied to the first enclosure 222. Accordingly, the power state category of the first enclosure 222 may be said to be impacted by the power supply.

5. A storage controller firmware (not shown in FIG. 3) impacts the storage of the first server 204. For instance, the storage of the first server 204 may fail due to the storage controller firmware. Accordingly, the storage state category of the first server 204 may be said to be impacted by the storage controller firmware.

In an example, the categories of state for the first element may be predefined depending on the different aspects of the first element that are likely to be impacted by its impacting elements. The plurality of categories of state may include, for example, a network state category, storage state category, power state category, temperature state category, and manageability state category.

Corresponding to the categorization of the states of the first element, the error states of the first element may also be categorized into different categories. For example, when one of the power supplies of the first server 202 fails, the error state may be categorized as the error state in the power state category. Similarly, when a disk of the first server 202 fails, the error state may be categorized as the error state in the storage state category, and when a network adapter of the first server 202 fails, the error state be categorized as the error state in the network state category.

Since, an impacting element may impact a subset of categories of state of the first element, therefore, when an error state is identified in a first category of state of the first element, the instructions 108 may cause identification of those impacting elements in the data center 202 that impact the first category of state of the first element. Subsequently, the instructions 110 may cause computation of the suspect score for the identified impacting elements alone, and not for the other impacting elements, which impact the other categories of states of the first element. For example, when the error state is present in the manageability state category of the first server 204, the suspect score may be computed for the first firmware 258, but not for the first enclosure 222.

Further, when the suspect score is computed for an impacting element in response to the error state in a first category of state of the first element, the instructions 110 may cause computation of the suspect score based on those impacted elements for which the first category of state is impacted by the impacting element. For this, the total number of impacted elements for the impacting element would be the total number of impacted elements for which the first category of state is impacted by the impacting element. Similarly, the number of impacted elements in the error state for the impacting element would be the number of impacted elements for which the error state is present in the first category of state. For example, when the suspect score is computed for the first enclosure 222 in response to the error state in the network state category of the first server 204, the second server 206 may be counted as one of the impacted elements, as the first enclosure 222 impacts the network state category of the second server 206, but not the first interconnect 302. Further, for the second server 206, it is determined whether the error state is present in the network state category, but not whether the error state is present in the temperature state category or the power state category, as the suspect score is computed in response to the error state in the network state category of the first server 204.

The computation of the suspect score for an impacting element considering the categories of state may be represented as follows:

$$S_{SC} = P_{SC}/T_{SC} \qquad (2)$$

where $S_{SC}$ represents the suspect score for the impacting element for a particular category of state, $T_{SC}$ represents the total number of impacted elements for which the particular category of state is impacted by the impacting element, and $P_{SC}$ represents the number of impacted elements having the error state in the particular category of state.

To facilitate identification of the impacting elements that impact the first element in a particular category of state, in an example, the dependency graph 112 may indicate the category of state of each impacted element that is impacted by the impacting element. Such an indication may be provided in an edge that is directed from the impacting element to the impacted element. Accordingly, in cases where a single impacting element is impacting a plurality of categories of states of an impacted element, multiple edges may be directed from the impacting element to the impacted element. For example, as illustrated, an edge 310 indicates that the first enclosure 222 impacts the network state category of the first server 202, an edge 312 indicates that the first enclosure 222 impacts the temperature state category of the first server 202, and an edge 314 indicates that the first enclosure 222 impacts the power state category of the first server 202. Further, the edges corresponding to different categories of states may be represented in a different manner in the dependency graph 112. For example, the edges 312 and 314, corresponding to temperature state category and power state category, respectively, may be represented by different types of dashed lines. The representation of the dependency graph 112 in this manner on the display (not shown in FIG. 3) of the system 100 allows a viewer to easily discern the various categories of state of elements and the impacting elements impacting the various categories.

The categorization of the error states of the first element and the computation of the suspect scores accordingly, as explained above, enables consideration of the relevant impacting elements for the computation of the suspect scores. Therefore, the suspect scores computed may be highly accurate.

In an example, to compute the suspect score, a weight of an impact of an impacting element on the first element may be utilized. The weight of an impact indicates the degree to which the impacting element impacts the state of the first element. In an example, the weight of an impact may be assigned based on the degree to which the impacting element impacts the state of the first element upon a change in its own state to the error state. For example, if the first enclosure 222 impacts the network state category of the first server 204 50% of time the first enclosure 222 has an error state in its own network state category, the weight of the impact of the first enclosure 222 on the network state category of the first server 204 may be said to be 0.5. On the other hand, if the first enclosure 222 impacts the network state category of the first server 204 every time the first enclosure 222 has an error state in its own network state category, the weight of the impact of the first enclosure 222 on the network state category of the first server 204 may be said to be 1. In case the impacting element can impact the state of the first element without changing its own state, the weight may be assigned based on a knowledge of an association between the impacting element and the first element.

As will be understood, the weight of the impact may range from 0 to 1. In an example, the suspect score computed for an impacting element utilizing the weight of the impact on a category of state of the first element may be represented as below:

$$S_{Sc} = W*P_{Sc}/T_{SC} \quad (3)$$

where W represents the weight of the impact of the impacting element on a category of state of the impacted element.

In some cases, the weight of impact of the impacting element on its different impacted elements may be different. In such a case, the suspect score for the impacting element may be computed as below:

$$S_{SC} = (W_1 + W_2 + W_3 + \ldots W_N)/T_{SC} \quad (4)$$

where N is the number of impacted elements for the impacting element that are having the error state in a category of state and $W_i$ is the weight of impact of the impacting element on its $i^{th}$ impacted element that is in the error state.

The weight of the impact may be assigned based on a historical analysis of the number of times the first element changed to the error state due to the change of the state of an impacting element. For example, if it is determined that, for every 10 instances the first enclosure 222 had an error state in the network state category, the first server 204 had an error state in five of those instances, then the weight may be determined to be 0.5. Further, the weight may also be modified depending on the error states of the impacting elements and the impacted elements. Also, as mentioned earlier, in case the impacting element can impact the state of the first element without changing its own state, the weight may be assigned based on a knowledge of an association between the impacting element and the first element.

In an example, the weight of the impact may be indicated in the dependency graph 112. For this, as illustrated in FIG. 3, each edge may also indicate the weight of the impact of the impacting element on the impacted element in a particular category of state of the impacted element. For example, the edge 312 indicates that the weight of the impact on the network state category of the first server 204 by the first enclosure 222 is 0.75.

Although, in the above examples, the weight of the impact is explained as being utilized to compute suspect scores when the states are categorized into a plurality of categories, the weight may be used to compute suspect scores even when the categorization of states is not performed. For example, using the weight of impact, (1) may be modified as below:

$$S = W*P/T \quad (5)$$

In the above explanation, the computation of the suspect score for an impacting element is explained as being performed based on the current states (the states at the time of computation of suspect score) of the impacted elements for the impacting element. For instance, the values of P and $P_{SC}$ are explained as being determined based on the number of impacted elements that are currently in the error state. However, in an example, the impacted elements that are currently in the normal state, but were in the error state in a time window prior to the change of the state of the first element to the error state may also be considered for computing the suspect score. For instance, if the time window is 10 days, the suspect scores may be computed based on the number of impacted elements that were in the error state any time between the day on which the first element changed to the error state and ten days before the day on which the first element changed to the error state. This may be represented as below:

$$S_{ACC} = (P_P + P)/T \quad (6)$$

where $S_{ACC}$ is the accumulated suspect score for a time window and $P_P$ is the number of impacted elements for the impacting element that were in the error state in a time window prior to the change of the state of the first element to the error state, but are in the normal state at present. For example, if the time window is one month, and if the suspect score is to be computed for the first enclosure 222 in response to the error state of the first server 204, the instructions 110 may cause determination as to whether the second server 206 was in the error state any time in a period of one month before the error state of the first server 204, even if the second server 206 is in the normal state currently. If the second server 206 was in the error state in the period of one month, then the second server 206 may be counted as one of the number of impacted elements that were in the error state ($P_P$) for the first enclosure 222.

The error states in the time window may be considered for computing the suspect score for an impacting element because not all impacted elements for the impacting element may change to the error state at the same time. For instance, the impacted element may change to the error state on interaction of with the impacted element in a particular manner. Therefore, while a first impacted element may get impacted due to the interaction with the impacting element in the particular manner at a first instance of time, a second impacted element may get impacted at a second instance of time. Therefore, by monitoring the error states of the impacted elements over a time window and accordingly computing the suspect score for the impacting element, the suspect score is more accurate, as impacts due to hidden dependencies of the impacted elements on the impacting element can be captured.

It is to be understood that the above-explained computation of suspect score based on error states in the time window can be applied even to the scenarios in which the states of the elements are classified into various categories. Further, such a computation can be performed even when the weights of the impact are utilized for computing the suspect scores.

Figure 4:
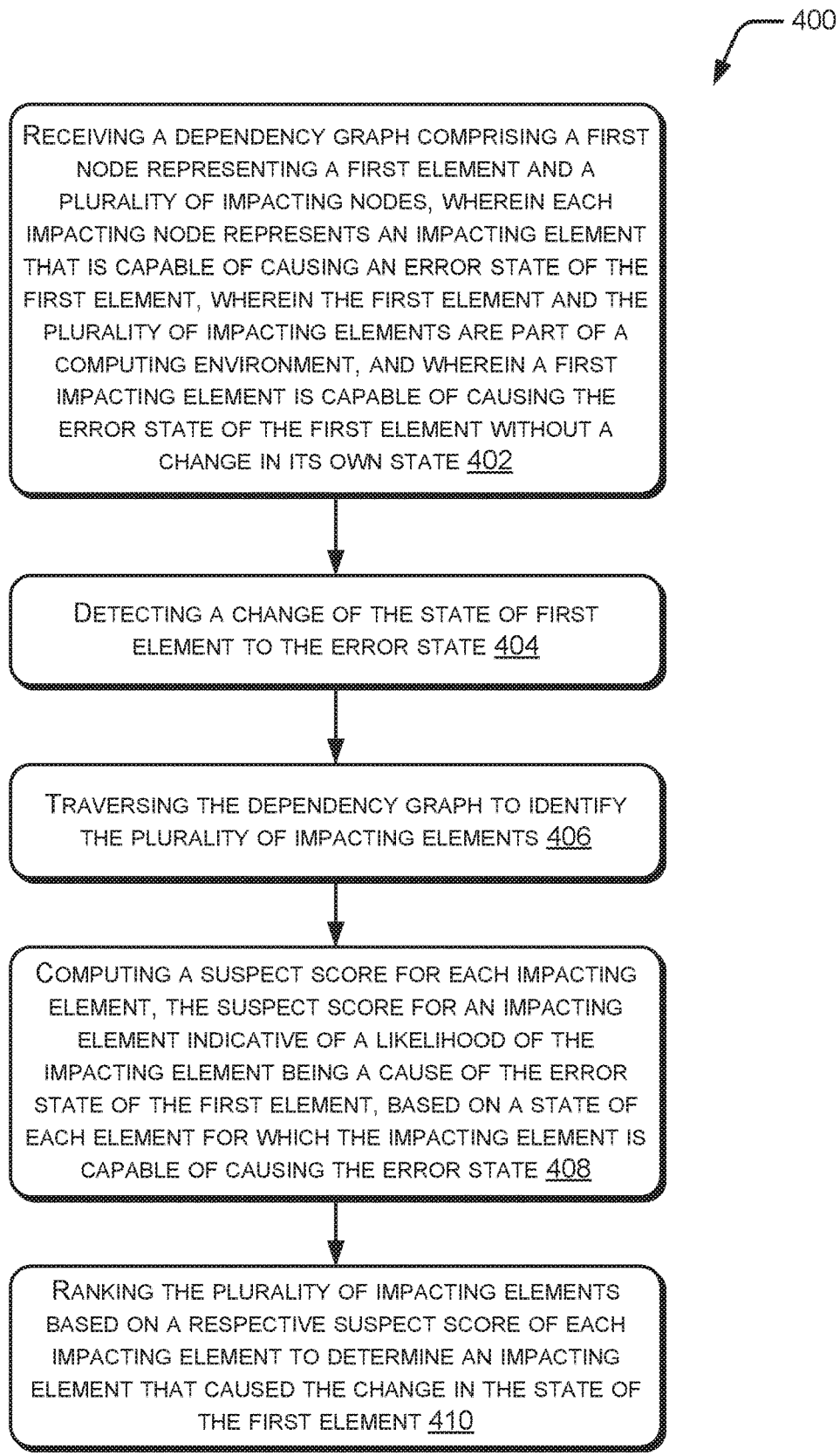
FIG. 4 illustrates a method for determining a cause of an error state a first element of a computing environment, according to example implementations of the present subject matter.
Figure 5:
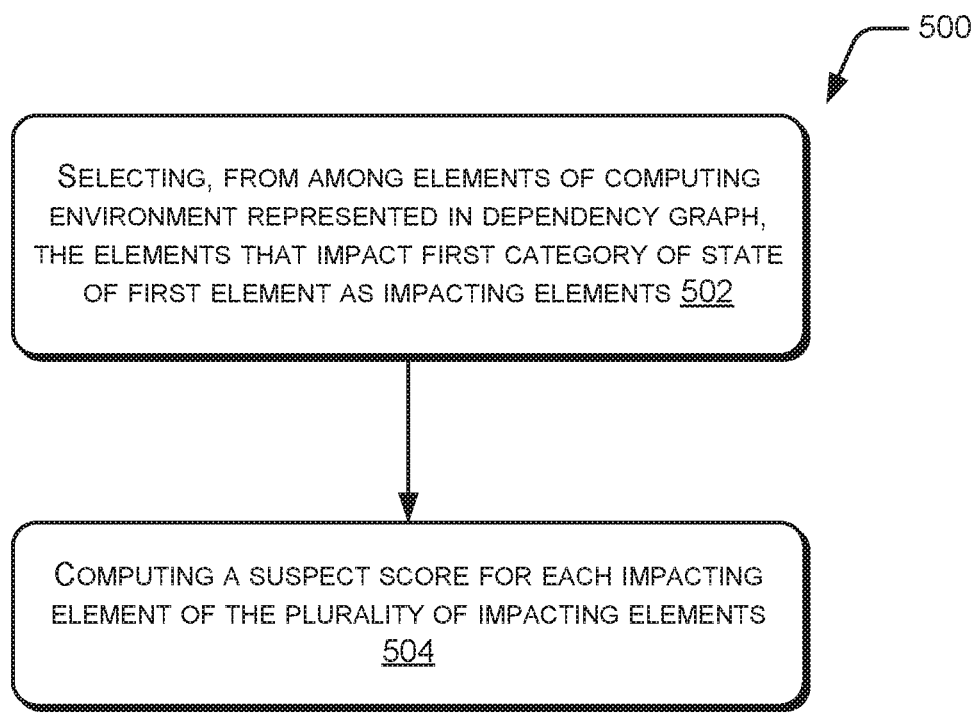
FIG. 5 illustrates a method for computing suspect score for impacting elements, according to an example implementation of the present subject matter.

FIGS. 4 and 5 illustrate methods 400 and 500, respectively, for determining a cause of an error state a first element of a computing environment, according to example implementations of the present subject matter.

The order in which the methods 400 and 500 are described is not intended to be construed as a limitation, and any number of the described method blocks may be combined in any order to implement the methods 400 and 500, or an alternative method. Furthermore, the methods 400 and 500 may be implemented by processor(s) or computing device(s) through any suitable hardware, non-transitory machine-readable instructions, or a combination thereof.

It may be understood that steps of the methods 400 and 500 may be performed by programmed computing devices and may be executed based on instructions stored in a non-transitory computer readable medium. The non-transitory computer readable medium may include, for example, digital memories, magnetic storage media, such as one or more magnetic disks and magnetic tapes, hard drives, or optically readable digital data storage media. Further, although the methods 400 and 500 may be implemented in a variety of systems, the methods 400 and 500 are described in relation to the system 100, for ease of explanation. In an example, the steps of the methods 400 and 500 may be performed by a processing resource, such as the processor 102.

Referring to method 400, at block 402, a dependency graph may be received. The dependency graph may include a first node representing a first element and a plurality of impacting nodes. The dependency graph may be, for example, the dependency graph 112, the first node may be, for example, the first node 114, and the plurality of impacting nodes may be, for example, the impacting nodes 116. Further, the first element may be a computing device, such as the first server 204 or the second server 206.

Each impacting node represents an impacting element that is capable of causing an error state of the first element and a first impacting element can cause the error state of the first element without a change in its own state. The impacting elements may be, for example, the first enclosure 222, second enclosure 224, first firmware 258, second firmware 260, and the like. The first impacting element may be software or firmware interacting with a computing device, such as the first firmware 258 or the second firmware 260, which interact with servers. The first element and the plurality of impacting elements are part of a computing environment, such as the data center 202.

At block 404, a change of the state of first element to the error state is detected.

At block 406, the dependency graph is traversed to identify the plurality of impacting elements.

At block 408, a suspect score is computed for each impacting element based on a state of each element for which the impacting element is capable of causing the error state. The suspect score for an impacting element is indicative of a likelihood of the impacting element being a cause of the error state of the first element. In an example, the suspect score is computed for an impacting element based on a total number of elements for which the impacting element is capable of causing the error state and a number of elements of the total number of elements that are in an error state. For instance, the suspect score may be computed as a ratio of the number of elements of the total number of elements that are in an error state to the total number of elements for which the impacting element is capable of causing the error state, as represented by equation (1).

At block 410, the plurality of impacting elements may be ranked based on a respective suspect score of each impacting element to determine an impacting element that caused the change in the state of the first element. For example, an impacting element having the highest suspect score may be considered to be the most likely cause of the error state of the first element. Accordingly, the impacting element may be analyzed in further detail for any malfunction, error, or the like. If, based on the analysis, it is determined that the impacting element did not cause the error state, the next impacting element, having the second highest suspect score may be analyzed.

As mentioned above, a suspect score is computed for each impacting element based on a state of each element for which the impacting element is capable of causing the error state. Each element for which the impacting element can cause the error state may be referred to as an impacted element for the impacting element. Also, as mentioned above, the suspect score is computed for an impacting element based on a total number of impacted elements for the impacting element and a number of elements of the total number of elements that are in an error state. In an example, in addition to impacted elements that are currently in the error state, impacted elements that are currently in the normal state, but were in the error state in a time window in a time window prior to the change of the first element to the error state may also be considered for computing the suspect score. In such a case, in addition to the number of elements that are in the error state, the number of elements that were in the error state in the time window are considered for computing the suspect score. This may be performed, for example, in the manner as explained with reference to equation (6).

In an example, to compute the suspect score, a weight of an impact of the impacting element on the first element may be considered. The weight of the impact of the impacting element on the first element indicates a degree to which the impacting element impacts the first element. Such a computation may be performed, for example, as explained with reference to equations (3)-(5). The computation of the suspect score using the weights may be performed even in the scenario even when the number of elements that were in the error state in the time window prior to the change of the first element to the error state are considered.

In an example, the error state of the first element may be first of a plurality of categories error state of the first element, as explained with reference to FIG. 3. The computation of suspect scores in such a case is explained below.

FIG. 5 illustrates a method 500 for computing suspect score for impacting elements, according to an example implementation of the present subject matter.

At block 502, from among the elements of the computing environment represented in the dependency graph, the elements that impact the first category of state of the first element are selected as the plurality of impacting elements. This may be performed, for example, by determining the category of state of the first element that is impacted each impacting element, as explained with reference to FIG. 3.

At block 504, suspect score is computed for each selected impacting element. The computation may be performed considering those impacted elements for which the impacting element can cause the error state in the first category of state, as explained earlier.

The computation of the suspect score based on categories of state of the first element, as explained above, can be utilized along with the weights of impact of the impacting elements on the first element and with the computation of suspect scores based on the impacted elements that were in the error state in a time window prior to the change of the first element to the error state.

Figure 6:
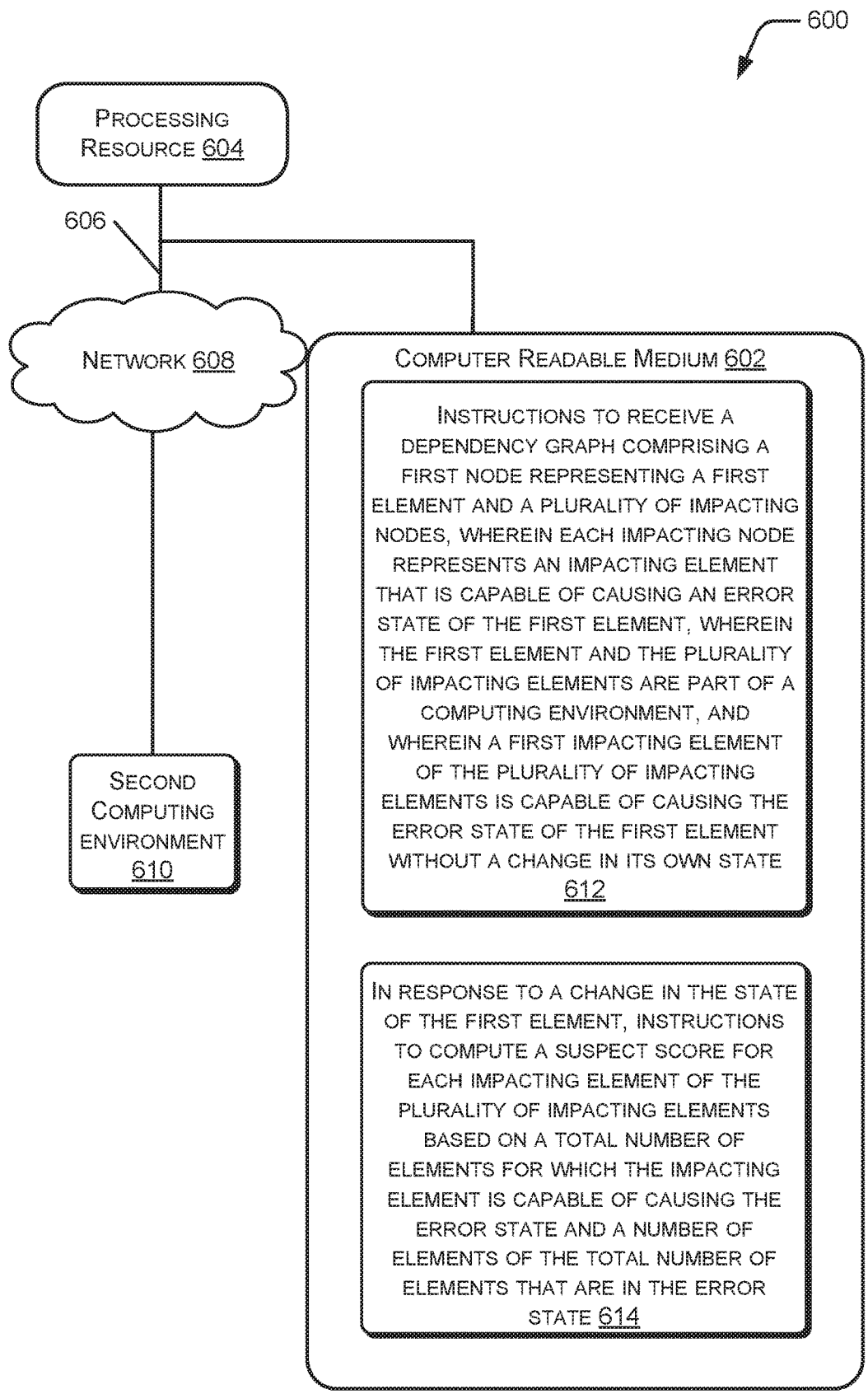
FIG. 6 illustrates a computing environment, implementing a non-transitory computer-readable medium for determining a cause of an error state of an element, according to an example implementation of the present subject matter.

FIG. 6 illustrates a computing environment 600, implementing a non-transitory computer-readable medium 602 for determining a likely cause of an error state of an element, according to an example implementation of the present subject matter.

In an example, the non-transitory computer-readable medium 602 may be utilized by a system, such as the system 100. The system 100 may be implemented in a public networking environment or a private networking environment. In an example, the computing environment 600 may include a processing resource 604 communicatively coupled to the non-transitory computer-readable medium 602 through a communication link 606.

In an example, the processing resource 604 may be implemented in a system, such as the system 100. The processing resource 604 may be the processor 102. The non-transitory computer-readable medium 602 may be, for example, an internal memory device or an external memory device. In one implementation, the communication link 606 may be a direct communication link, such as any memory read/write interface. In another implementation, the communication link 606 may be an indirect communication link, such as a network interface. In such a case, the processing resource 604 may access the non-transitory computer-readable medium 602 through a network 608. The network 608 may be a single network or a combination of multiple networks and may use a variety of different communication protocols.

The processing resource 604 and the non-transitory computer-readable medium 602 may also be communicatively coupled to a second computing environment 610 over the network 608. The second computing environment 610 may be, for example, the data center 202.

In an example implementation, the non-transitory computer-readable medium 602 includes a set of computer-readable instructions to determine a likely cause of an error state of an element, such as an element in the second computing environment 610. The set of computer-readable instructions can be accessed by the processing resource 604 through the communication link 606 and subsequently executed to perform acts to determine cause of error state of an element.

Referring to FIG. 6, in an example, the non-transitory computer-readable medium 602 includes instructions 612 that cause the processing resource 604 to receive a dependency graph including a first node representing a first element and a plurality of impacting nodes. The dependency graph may be the dependency graph 112. Each impacting node represents an impacting element that is capable of causing an error state of the first element and a first impacting element is capable of causing the error state of the first element without a change in its own state. The first element may be a computing device, such as the first server 204, and the first impacting element may be software or firmware interacting with the computing device, such as the first firmware 258. The first element and the plurality of impacting elements are part of a computing environment, such as the second computing environment 610

The non-transitory computer-readable medium 602 includes instructions 614 that cause computation of a suspect score for each impacting element in response to a change of the state of the first element to the error state. The suspect score for an impacting element is indicative of a likelihood of the impacting element being a cause of the error state of the first element. The suspect score is computed based on a total number of elements for which the impacting element is capable of causing the error state and a number of elements of the total number of elements that are in the error state. In an example, the computation of the suspect score may be performed in the manner explained with reference to equation (1).

In an example, the non-transitory computer-readable medium 602 includes instructions that cause the processing resource 604 to compute the suspect score for an impacting element based on a number of elements for which the impacting element is capable of causing the error state that changed to the error state in a time window prior to the change of the first element to the error state. This may be performed, for example, in the manner explained with reference to equation (6).

In an example, the state of the first element may be a first category of state of a plurality of categories of state of the first element. The plurality of categories of state may include a network state category, storage state category, power state category, temperature state category, and manageability state category. In response to the change of the state of the first element, the non-transitory computer-readable medium 602 includes instructions that cause the processing resource 604 to select, from among elements of the computing environment represented in the dependency graph, elements that are capable of causing the error state in the first category of state as the plurality of impacting elements. Such a selection may be performed in the manner as explained with reference to FIG. 3.

The present subject matter enables determination of the cause of error state of elements of a computing environment. The computation of suspect score for an impacting element based on the states of each element for which the impacting element can cause an error state provides an accurate measure of the likelihood of the impacting element being the cause of the error state. Also, the present subject matter ensures that the suspect score is computed even for impacting elements that cause the error state of other elements without undergoing a state change themselves. Therefore, the present subject matter can be used to identify elements that cause the error state of other elements without changing to an error state themselves or without reporting an event themselves.

Further, by considering impacted elements that were in the error state in a time window prior to the change of the first element to the error state for computing the suspect score, error states due to hidden relationships between the impacted elements and the impacting elements can be captured. Still further, categorizing the error states of the elements and accordingly computing suspect scores provides a more refined and accurate suspect score. The present subject matter can be utilized for computing suspect scores for elements spanning across multiple layers of a data center, such as hardware layer, operating system layer, virtualization layer, and the like.

Although implementations of determination of cause of error state of elements have been described in language specific to structural features and/or methods, it is to be understood that the present subject matter is not necessarily limited to the specific features or methods described. Rather, the specific features and methods are disclosed and explained as example implementations.

We claim:

1. A system comprising:
a processor; and
a memory to store a dependency graph corresponding to a computing environment, the dependency graph comprising:
a first node representing a first element in the computing environment;
a plurality of impacting nodes, each impacting node representing an impacting element in the computing environment, wherein each impacting element is capable of causing an error state of the first element and a first impacting element of the plurality of impacting elements is capable of causing the error state without a change in its own state; and
an edge from each impacting node to the first node to indicate a direction of impact of the impacting element on a state of the first element;
wherein the memory is coupled to the processor and stores instructions executable by the processor to:
detect a change of the state of the first element to the error state;
traverse the dependency graph to identify the plurality of impacting elements; and
compute a suspect score for each impacting element, the suspect score indicative of a likelihood of the impacting element being a cause of the error state of the first element, based on a total number of elements for which the impacting element is capable of causing the error state and a number of elements of the total number of elements that are in the error state.

2. The system of claim 1, wherein the computing environment is a data center.

3. The system of claim 1, wherein the first element is one of a server, an interconnect, and a switch.

4. The system of claim 1, wherein the first impacting element is one of a firmware and a software interacting with the first element.

5. The system of claim 4, wherein the first element is a computing device and the first impacting element is a firmware of a remote management processor embedded in the computing device, the remote management processor facilitating management of the computing device from a remote location.

6. The system of claim 1, wherein
the error state of the first element is an error in a first category of state of a plurality of categories of state of the first element, the plurality of categories of states comprising at least two of a network state category, storage state category, power state category, temperature state category, and manageability state category, and
in response to the change of the state of the first element to the error state, the instructions are executable by the processor to identify, from among elements in the computing environment represented in the dependency graph, elements that are capable of causing the error state in the first category of state as the plurality of impacting elements.

7. The system of claim 6, wherein, to compute the suspect score for an impacting element of the plurality of impacting elements, the instructions are executable by the processor to:
determine the element for which the impacting element is capable of causing the error state in the first category of state; and
compute the suspect score for the impacting element based on the first category of state for each determined element.

8. The system of claim 1, wherein the instructions are executable by the processor to compute the suspect score for an impacting element based on a number of elements for which the impacting element is capable of causing the error state that were in the error state in a time window prior to the change of the state of the first element.

9. The system of claim 1, wherein the instructions are executable by the processor to compute the suspect score for an impacting element based on a weight of an impact of the impacting element on the first element, wherein the weight of the impact of the impacting element on the first element indicates a degree to which the impacting element impacts the first element.

10. A method comprising:
receiving, by a processing resource, a dependency graph comprising a first node representing a first element and a plurality of impacting nodes, wherein each impacting node represents an impacting element that is capable of causing an error state of the first element, wherein a first impacting element is capable of causing the error state of the first element without a change in its own state, and wherein the first element and the plurality of impacting elements are part of a computing environment;
detecting, by the processing resource, a change of a state of the first element to the error state;
traversing, by the processing resource, the dependency graph to identify the plurality of impacting elements;
computing, by the processing resource, a suspect score for each impacting element, the suspect score indicative of a likelihood of the impacting element being a cause of the error state of the first element, based on a total number of elements for which the impacting element is capable of causing the error state and a number of elements of the total number of elements that are in the error state; and
ranking, by the processing resource, the plurality of impacting elements based on a respective suspect score of each impacting element to determine an impacting element that caused the change in the state of the first element.

11. The method of claim 10, comprising computing the suspect score for an impacting element based on a number of elements for which the impacting element is capable of causing the error state that were in the error state in a time window prior to the change of the state of the first element.

12. The method of claim 10, wherein
the state of the first element is a first category of state of a plurality of categories of state of the first element, the plurality of categories of states comprising at least two of a network state category, storage state category, power state category, temperature state category, and manageability state category, and
in response to the change of the state of the first element, the method comprises selecting, from among elements of the computing environment represented in the dependency graph, elements that are capable of causing the error state in the first category of state as the plurality of impacting elements.

13. The method of claim 12, wherein computing the suspect score for the impacting element of the plurality of impacting elements further comprising:
determining the element for which the impacting element is capable of causing the error state in the first category of state; and
computing the suspect score for the impacting element based on the first category of state for each determined element.

14. The method of claim 10, comprising computing the suspect score for an impacting element based on a weight of an impact of the impacting element on the first element, wherein the weight of the impact of the impacting element on the first element indicates a degree to which the impacting element impacts the first element.

15. The method of claim 10, wherein the first element is a computing device and the first impacting element is one of a firmware and a software interacting with the first element.

16. The method of claim 10, wherein the computing environment is a data center.

17. A non-transitory computer-readable medium comprising instructions for determining a cause of an error state of an element, the instructions being executable by a processing resource to:
receive a dependency graph comprising a first node representing a first element and a plurality of impacting nodes, wherein each impacting node represents an impacting element capable of causing an error state of the first element, wherein the first element and the plurality of impacting elements are part of a computing environment, and wherein a first impacting element of the plurality of impacting elements is capable of causing the error state of the first element without a change in its own state; and
in response to a change of a state of the first element to the error state, compute a suspect score for each impacting element of the plurality of impacting elements, the suspect score for an impacting element indicative of a likelihood of the impacting element being a cause of the error state of the first element, based on a total number of elements for which the impacting element is capable of causing the error state and a number of elements of the total number of elements that are in the error state.

18. The non-transitory computer-readable medium of claim 17, wherein the state of the first element is a first category of state of a plurality of categories of state of the first element, the plurality of categories of states comprising at least two of a network state category, storage state category, power state category, temperature state category, and manageability state category, and in response to the change of the state of the first element, the instructions are executable by the processing resource to select, from among elements of the computing environment represented in the dependency graph, elements that are capable of causing the error state in the first category of state as the plurality of impacting elements.

19. The non-transitory computer-readable medium of claim 17, wherein the instructions are executable by the processing resource to compute the suspect score for an impacting element based on a number of elements for which the impacting element is capable of causing the error state that changed to the error state in a time window prior to the change of the state of the first element.

20. The non-transitory computer-readable medium of claim 17, wherein the first element is a computing device and the first impacting element is one of a firmware and a software interacting with the first element.

\* \* \* \* \*